Dec. 25, 1945.  A. F. MILLER  2,391,586
AUTOMOTIVE VEHICLE SPEED CONTROL DEVICE
Filed Jan. 26, 1944  2 Sheets-Sheet 1
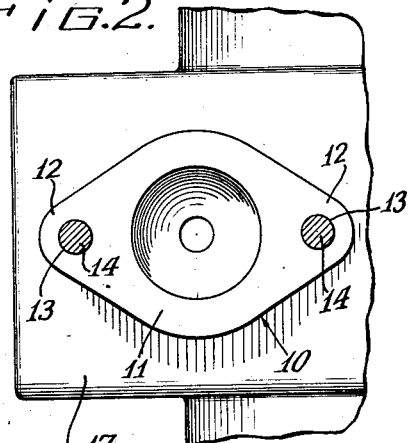
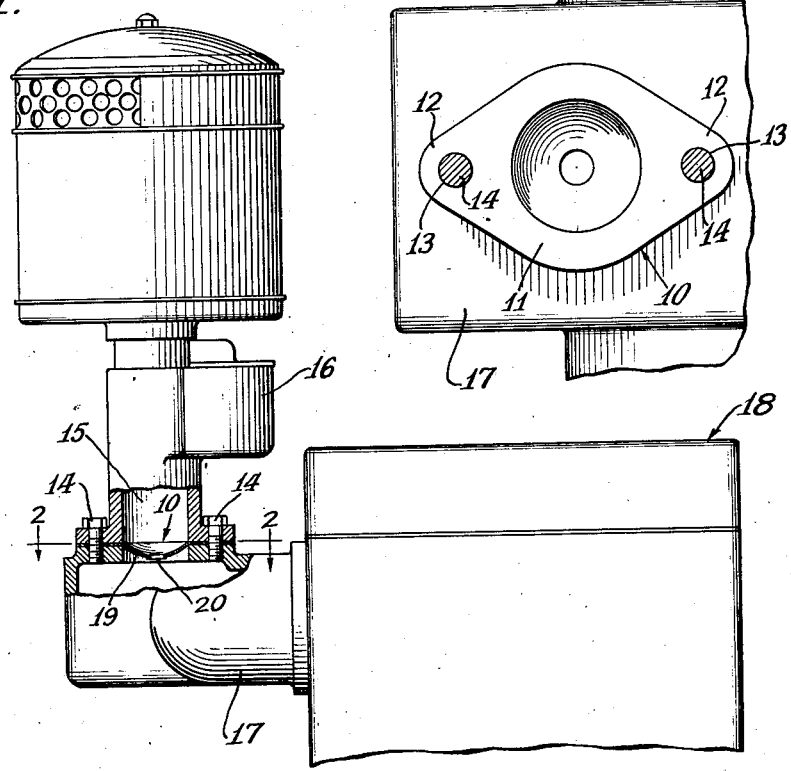
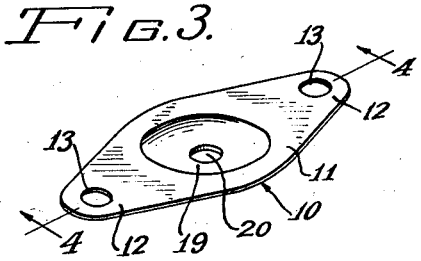
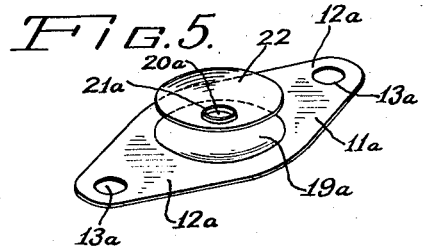
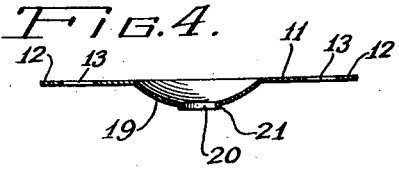
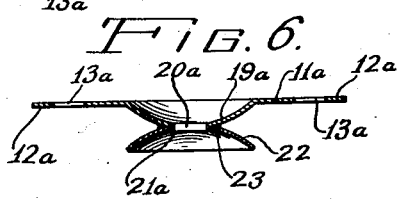
Inventor:
August F. Miller
By Wallace and Cannon
Attorneys Dec. 25, 1945.          A. F. MILLER                2,391,586
            AUTOMOTIVE VEHICLE SPEED CONTROL DEVICE
                     Filed Jan. 26, 1944         2 Sheets-Sheet 2
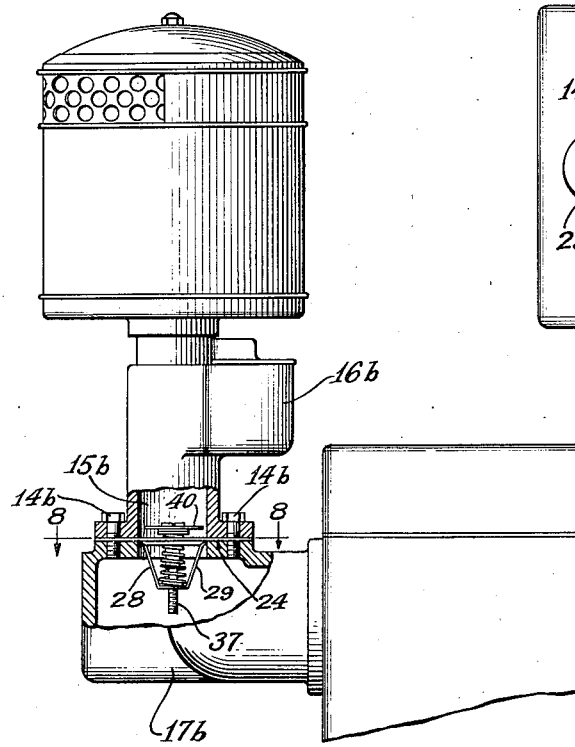
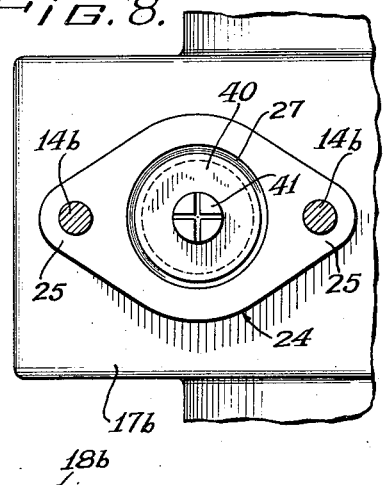
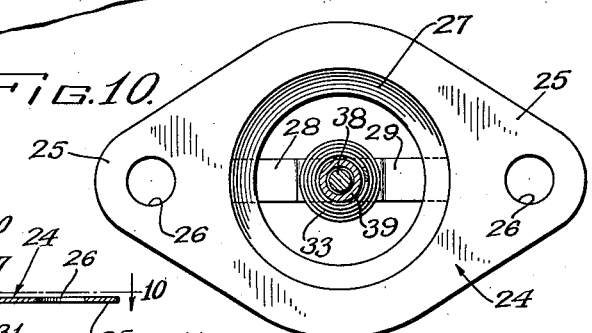
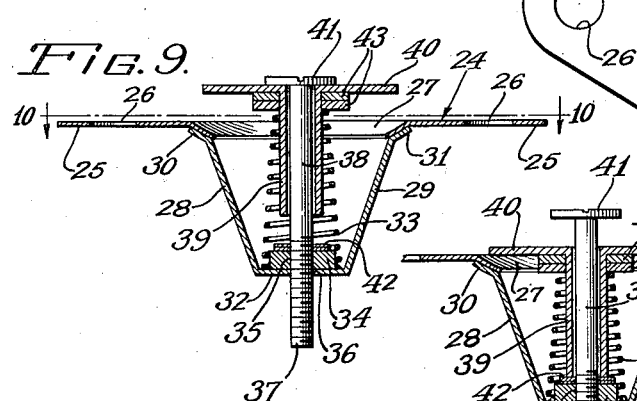
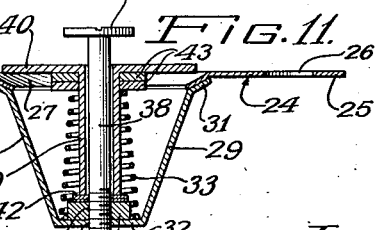
Inventor:
August F. Miller
By Wallace and Cannon
Attorneys Patented Dec. 25, 1945

2,391,586

UNITED STATES PATENT OFFICE 2,391,586

AUTOMOTIVE VEHICLE SPEED CONTROL DEVICE

August F. Miller, Chicago, Ill., assignor to Vac-U-Matic Corporation, Chicago, Ill., a corporation of Illinois Substituted for abandoned application Serial No. 463,671, October 28, 1942. This application January 26, 1944, Serial No. 519,700

1 Claim. (Cl. 138—40)

The present application represents a refiling of appellant's earlier but abandoned application, Serial No. 463,671 on the same subject matter.

This invention relates to an automotive vehicle speed control device.

More particularly, this invention relates to an automotive vehicle speed control device which may readily be arranged in the air-fuel mixture passage of an automotive vehicle internal combustion engine.

An object of the invention is to provide an automotive vehicle speed control device for accurately controlling the speed of an internal combustion engine operated automotive vehicle such as a passenger car, truck, bus or the like.

An additional object of the invention is to afford an automotive vehicle speed control device which is simple and inexpensive in construction and may readily be installed in the air-fuel mixture passage of an automotive vehicle internal combustion engine without requiring reconstruction of the engine or the parts thereof. An additional object of the invention is to afford a novel automotive vehicle speed control device which will accurately control the speed of an internal combustion engine and an automotive vehicle driven thereby and which may readily be constructed and adapted for use upon various types of internal combustion engine operated automotive vehicles including passenger cars, trucks, buses and the like made by different manufacturers.

Another object of the invention is to construct and arrange the new automotive vehicle speed control device in such a manner that it will not interfere with or impede or block the passage of the air-fuel mixture through the air-fuel mixture passage of an internal combustion engine with which it is associated, except to the extent that the size of the fuel outlet opening therein will control the volume of the air-fuel mixture passing through the air-fuel mixture passage, to the end that blocking of the air-fuel mixture in the air-fuel mixture passage and consequent difficulty in starting the engine, as has been experienced in the use of somewhat similar prior art devices, are eliminated.

An additional object of the invention is to provide, in one embodiment thereof, a novel and relatively simple and inexpensive valve structure which may be readily installed in the air-fuel mixture passage of an automotive vehicle internal combustion engine, or the like, for accurately controlling or regulating the volume of the air-fuel mixture flowing therethrough and the consequent speed of the said internal combustion engine and of an automotive vehicle driven thereby.

A further object of the invention, ancillary to the foregoing and immediately preceding object, is to construct and arrange the new valve structure in such a manner that it will not retard the acceleration of an internal combustion engine driven automotive vehicle with which the new valve structure may be employed.

Other and further objects of the present invention will be apparent from the following description and claim and will be understood by reference to the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claim.

In the drawings,

Fig. 1 is a fragmentary elevational view of an internal combustion engine showing a typical embodiment of the new automotive vehicle speed control device associated therewith, a portion of the wall of the air-fuel mixture passage being broken away to show the arrangement of the new speed control device therein;

Fig. 2 is a top plan view on line 2—2 in Fig. 1, partly in section;

Fig. 3 is a perspective view of a typical embodiment of the new automotive vehicle speed control device;

Fig. 4 is a longitudinal sectional view on line 4—4 in Fig. 3;

Fig. 5 is a perspective view of a modified form of the invention;

Fig. 6 is a central longitudinal sectional view of the form of the device shown in Fig. 5, the position of the parts being inverted better to illustrate the construction thereof;

Fig. 7 is a view similar to Fig. 1 but illustrating another modification of the invention;

Fig. 8 is a top plan view on line 8—8 in Fig. 7, partly in section;

Fig. 9 is a central vertical sectional view of the form of the invention which is illustrated in Figs. 7 to 11, inclusive, and showing the movable valve member in its raised position;

Fig. 10 is a top plan view on line 10—10 in Fig. 9, partly in section; and

Fig. 11 is a central vertical sectional view similar to Fig. 9 but showing the movable valve member in its lowered position.

A typical embodiment of the new automotive vehicle speed control device is illustrated in Figs. 1, 2, 3 and 4 of the drawings, wherein it is generally indicated at 10, and comprises a one-piece body 11 which may be made of any suitable and available and relatively inexpensive material such, for example, as in the form of a one-operation metal stamping from relatively thin flat sheet metal stock, or from plastic or other materials.

As shown in Figs. 2 and 3, the body 11 of the new automotive vehicle speed control device 10 is generally oval-shaped in plan and includes a pair of attaching ear portions 12 each of which is provided with an opening 13 for the reception of a fastening element or bolt 14 whereby the new automotive vehicle speed control device may be retained in position of use in the air-fuel mixture passage 15 of an internal combustion engine 18 between the carburetor 16 and the intake manifold 17 thereof, as shown in Fig. 1.

As shown in Figs. 1 to 4, inclusive, the body 11 of the new automotive vehicle speed control device 10 includes a cup-shaped pocket in the form of a depression or concavity 19 which is arranged centrally of the body 11. The pocket or depression 19 is made to conform to the cross sectional area or diameter of the air-fuel mixture passage 15 and the circular fuel outlet opening 20 is provided in the center of the depression or concavity 19, at the bottom thereof. The outer or bottom marginal edge of the fuel outlet opening 20 is provided with a bead 21 which extends circumferentially therearound, for a reason which will be explained hereinafter.

It will be noted, in this connection, that the central fuel outlet opening 20 in the concavity or depression 19 must be accurately formed as to size or diameter because the size or diameter of this opening determines the volume of the air-fuel mixture which will pass therethrough and thus controls the speed of the internal combustion engine 18 and of the automotive vehicle controlled or driven thereby.

It will also be noted, in this connection, that in order to insure that the fuel outlet opening 20 will retain its desired size and shape and will not be deformed during or after the operation of forming this opening, a strengthening or reinforcing bead 21 is provided thereon during the operation of punching the fuel outlet opening 20 in the body 11.

In the use of the new automotive vehicle speed control device 10 the same may readily be installed in position of use in the air-fuel mixture passage of an internal combustion engine 18 without necessitating any reconstruction of the engine or the parts thereof and without necessitating any particular skill on the part of the person installing the device. This is accomplished by merely removing the conventional fastening elements or bolts 14 employed to mount the carburetor 16 upon the intake manifold 17 and then arranging the body 11 of the new automotive vehicle speed control device 10 in and so that it extends across the air-fuel mixture passage 15 with the depression or concavity 19 facing downwardly, that is to say, away from the carburetor 16 and toward the intake manifold 17. The device may then be secured in position of use by inserting the bolts 14 through the openings 13 in the ear portions 12 of the body 11 and tightening the bolts 14 back into position of use.

When the new automotive vehicle speed control device 10 is thus installed in position of use, the depression or concavity 19 covers or fills the entire cross sectional area of the air-fuel mixture passage 15 and as the air-fuel mixture flows through the air-fuel mixture passage 15 it strikes the depression or concavity 19 which imparts a whirling motion thereto. The air-fuel mixture then flows through the central fuel outlet opening 20 in the depression or concavity 19 and then flows into the intake manifold 17 of the engine 18.

It will be noted, as pointed out above, that the concavity or depression 19 covers the entire cross sectional area of the air-fuel mixture passage 15 so that any and all fuel, in either liquid or vapor form, flowing through the air-fuel mixture passage 15 must engage the depression or concavity 19 and pass through the fuel outlet opening 20. It will thus be seen that the size or diameter of the fuel outlet opening 20 controls the volume of fuel which will pass through the air-fuel mixture passage 15 into the intake manifold 17 of the internal combustion engine 18 and by accurately controlling the size or diameter of the fuel outlet opening 20 and adjusting the size of this opening to the particular type and size of engine with which it is to be used, the speed of various types of internal combustion engine operated automotive vehicles may be accurately controlled to within an accuracy or variation of a mile per hour from the desired or intended maximum speed to be permitted.

It will also be observed that since the concavity or depression 19 is of the same diameter or cross sectional area as the air-fuel mixture passage 15 and faces downwardly in the air-fuel mixture passage 15, the liquid phase or portion of the air-fuel mixture flowing therethrough will always drain from the depression or concavity 19 through the fuel opening 20 by gravity and will not accumulate upon or be blocked by the body of the automotive vehicle speed control device as occurs in the use of certain somewhat similar prior art automotive vehicle speed control devices. Hence, it will be seen that the new automotive vehicle speed control device does not block or impede the flow of the air-fuel mixture through the air-fuel mixture passage 15 except to the extent that the flow of the air-fuel mixture is controlled by the size or diameter of the fuel outlet opening 20. This feature is particularly important in starting an internal combustion engine with which the new speed control device is associated because if it were not for the depressed portion or concavity 19, and for the fact that the depression or concavity 19 has the same diameter as the air-fuel mixture passage 15 and hence covers the entire cross sectional area of the latter, a substantial amount of the air-fuel mixture would be blocked and held by the body of the device and the starting of the engine would thus be materially hindered. Hence, in this manner the new automotive vehicle speed control device overcomes one of the difficulties heretofore experienced in the use of somewhat similar automotive vehicle speed control devices.

A slightly modified form of the invention is illustrated in Figs. 5 and 6 and those parts of this form of the invention which correspond to similar parts in the form of the invention which is illustrated in Figs. 1 to 4, inclusive, have been given similar reference numbers followed by the distinguishing letter "a."

The form of the invention illustrated in Figs. 5 and 6 is substantially similar to the embodiment of the invention which is illustrated in Figs. 1 to 4, inclusive, except that in this form of the invention a fuel-deflecting or fuel-spreading member 22, which is, in general, complementary to the part 19a in size, shape and diameter, is secured in any suitable manner, as by soldering, to the bead 21a which extends circumferentially around the fuel outlet opening 20a in the part 19a. To this end the fuel-deflecting or fuel-spreading member 22 is provided with a centrally arranged opening 23 for the reception of the bead or flange 21a on the depressed portion 19a of the member 11a, as shown in Fig. 6. As is also shown in Fig. 6, the position of the fuel-deflecting or fuel-spreading member 22 upon or relative to the depressed portion 19a of the member 11a is reversed or opposite, that is to say, in position of use the fuel-deflecting or fuel-spreading member 22 extends convexly upwardly in the air-fuel mixture passage rather than extending concavely downwardly therein as does the depressed portion 19a of the member 11a.

In the use of the form of the invention which is shown in Figs. 5 and 6, the member 11a, in which the depressed portion or concavity 19a is formed, may be so positioned in the air-fuel mixture passage 15 of an internal combustion engine that the said depressed portion or concavity 19a extends concave downwardly in and relative to the air-fuel mixture passage 15 and so that the fuel-deflecting member 22 is convex upwardly in and relative to the said air-fuel mixture passage 15.

In the use of the form of the invention which is shown in Figs. 5 and 6, the air-fuel mixture, as it flows through the air-fuel mixture passage 15, will strike and enter the concavity 19a in the member 11a whereupon it will flow through the outlet opening 20a, into the intake manifold 17 of the engine 18.

It will be noted, in this connection, that as the air-fuel mixture passes out of the fuel outlet opening 20a it will be deflected or spread throughout the air-fuel mixture passage 15 by the fuel-deflecting or fuel-spreading member 22. In this manner the volume of the air-fuel mixture flowing through the air-fuel mixture passage 15 and the intake manifold 17 into the engine 18 will be controlled and will, in turn, thus accurately control the speed of the engine 18 and of an automotive vehicle driven thereby.

Another typical and a preferred embodiment of the invention is illustrated in Figs. 7 to 11, inclusive, of the drawings and those parts of the internal combustion engine which are illustrated in Figs. 7 and 8, and which correspond to similar parts shown in Figs. 1 and 2, have been given similar reference numerals followed by the distinguishing reference character "b."

While the form of the invention which is illustrated in Figs. 1 to 4, inclusive, and the form shown in Figs. 5 and 6, work quite satisfactorily, in general, there may be in certain instances some tendency in the use of these forms of the invention to prevent or retard rapid acceleration of an internal combustion engine and automotive vehicle driven thereby and with which such forms of the invention may be associated.

However, in the embodiment of the invention which is illustrated in Figs. 7 to 11, inclusive, of the drawings, any tendency to prevent or retard rapid acceleration is eliminated and a speed control device is provided which is accurate, rapid and positive in operation.

The form of the invention which is illustrated in Figs. 7 to 11, inclusive, may be employed in conjunction with the air-fuel mixture passage, as 15b, of an internal combustion engine, as 18b. This form of the invention comprises a preferably metallic member 24 which corresponds generally to the members 11 and 11a, being substantially oval-shaped in plan, and including a pair of ear portions 25 each of which has an opening 26 formed therein for the reception of a fastening element, such as one of the bolts 14b by means of which the form of the invention shown in Figs. 7 to 11, inclusive, may be mounted in position of use in the air-fuel mixture passage 15b of the engine 18b, in substantially the same manner as in the form of the invention which is shown in Figs. 1 to 4, inclusive, is illustrated as being mounted in the air-fuel mixture passage 15 (Fig. 1), that is to say, by means of the same fastening elements or bolts 14b which are used to mount the carburetor 16b upon the intake manifold 17b of the engine 18b.

In the form of the invention which is illustrated in Figs. 7 to 11, inclusive, the member 24 has a depressed and substantially frusto-conical portion 27 formed therein, substantially centrally thereof, and when the member 24 is positioned in the air-fuel mixture passage 15b this frusto-conical portion 27 extends downwardly in and relative to the air-fuel mixture passage 15b, that is to say, in the direction of flow of fuel from the carburetor 16b, through the air-fuel mixture passage 15b, into the intake manifold 17b of the engine 18b.

The form of the invention which is illustrated in Figs. 7 to 11, inclusive, includes a spider which is substantially U-shaped and includes valve assembly supporting member 28—29—32 and this valve assembly supporting member 28—29—32 includes a pair of hanger or supporting arms 28 and 29. The hanger or supporting arms 28 and 29 are secured at their upper end, as at 30 and 31, respectively, to the depressed or frusto-conical portion 27 of the member 24, on the bottom side thereof, and in any suitable manner, as by means of soldering or the like. As shown in Figs. 7, 9 and 11 the hanger or supporting arms 28 and 29 are integrally joined together at the lower ends thereof by means of an interconnecting web portion 32.

A compression coil spring 33, which is preferably somewhat larger at its base or lower end than at its top or upper end, (Figs. 7, 9 and 11), has its lower and relatively larger end mounted upon the interconnecting web portion 32 of the supporting member or hanger 28—29—32. The lower end portion of the spring 33 is disposed around or is anchored to a nut 34 which is carried by the web 32 and has a threaded opening 35 formed therein. Formed in the web 32, in alignment with the threaded opening 35 in the nut 34, is an opening 36, and the threaded lower end portion 37 of a relatively stationary valve stem guiding member post 38 is screwed into the threaded opening 35 in the nut 34 and extends downwardly through the opening 36 in the web 32, as shown in Figs. 7, 9 and 11.

Slidably mounted upon the valve stem guiding member or post 38 is a tubular valve stem 39 and carried by the tubular valve stem 39, at the upper end thereof, and integral therewith, is a disc-shaped valve head 40. The movable valve stem 39 and the valve head 40 thereon are retained upon the valve stem guiding member or post 38 by means of an annular or disc-shaped retaining flange 41 which is formed upon the valve stem guiding member 38 at the upper end thereof.

Suitable spacing washers 42 may be arranged upon the nut 34 and around the valve stem guiding member or post 38 and one or more washers, as 43, may be arranged around the tubular valve stem 39 between the upper end of the spring 33 and the valve head 40 to vary or adjust the compression of the coil spring 33.

In the use of the form of the invention which is illustrated in Figs. 7 to 11, inclusive, the valve assembly embodied therein may be arranged in the air-fuel mixture passage 15b of an internal combustion engine 18b, in the manner hereinbefore explained, and the valve head 40 thereof will initially and normally be disposed in raised position, as shown in Fig. 9, when the engine 18b is idling.

However, when the foot-operated accelerator of the automotive vehicle driven by the engine 18b is depressed to accelerate the speed of the vehicle, and when the volume of the air-fuel mixture flowing through the air-fuel mixture passage 15b reaches a point at which the automotive vehicle driven by the engine 18b will have acquired a predetermined speed such, for example, as 35 miles per hour, the partial vacuum developed in the air-fuel mixture passage 15b, and consequent pressure differential upon opposite sides of the valve head or disc 41 will force the latter downwardly, against the action of the spring 33, into the position in which the parts are shown in Fig. 11. During this movement the tubular valve stem 39 is guided by and slides upon its guiding member or post 38.

It will be noted that when the parts are thus disposed in lowered position, as in Fig. 11, the valve disc or head 40 is disposed relatively close to but slightly above the upper surface of the frusto-conical portion 27 of the member 24 and the lower end portion of the tubular valve stem 39 is disposed in engagement with the uppermost one of the washers 42, as shown in Fig. 11. When the parts are thus disposed in lowered position, as in Fig. 11, the space thus afforded between the valve disc or head 40 and the upper surface of the depressed portion 27 of the member 24 is such as to permit a sufficient volume of the air-fuel mixture to flow through the space between the valve disc or head 40 and the upper surface of the depressed portion 27 of the member 24 to maintain the engine 18b and the automotive vehicle driven thereby at a predetermined and desired vehicle speed and such, for example, as 35 miles per hour.

However, if and when the driver of the vehicle drawn by the engine 18b releases the accelerator pedal, the degree of partial vacuum in the air-fuel mixture passage 15b, and the resultant air pressure differential upon opposite sides of the valve disc or head 40 will be decreased, whereupon the compression spring 33 will then urge the valve disc or head 40 and its supporting stem 39 back into raised or idling position, as in Figs. 7 and 8.

It will be noted that the space between the lower surface of the valve disc or head 40 and the upper surface of the depressed and substantially frusto-conical portion 27 of the member 24 may be varied by varying the number and thickness of the washers 42 which are arranged upon the nut 34 and that the compression of the spring 33 may be varied by varying the thickness and number of the washers 43.

It will thus be seen that by varying the thickness and number of the spacing washers 42, the extent of the downward movement of the tubular valve stem 39 and of the disc-shaped valve head 40 carried thereby may be varied and controlled. In this manner the distance or space which will be provided between the bottom of the peripheral edge of the valve disc or head 40 and the upper surface of the depressed or tapered side wall 27 of the centrally arranged opening in the relatively fixed member 24 may be varied so as to vary and control the volume of fuel which will flow through this space, in a given length of time, when the movable valve member 39—40 is in its lowered position. This enables the new valve assembly or unit to be adjusted to any speed at which it may be desired to operate the internal combustion engine and the automotive vehicle with which the new valve assembly are employed, since, as will readily be understood, the greater the distance or space between the valve head 40, and the tapered side wall 27, when the said valve head 40 is in its lowered position, the greater will be the volume of fuel flowing through this space, in a given unit of time, and the greater will be the resulting engine and automotive vehicle speed and, conversely, the smaller this space or distance is the lower will be the resulting engine and automotive vehicle speed.

The form of the invention which is shown in Figs. 7 to 11, inclusive, is very fast and positive in operation and has no tendency to prevent or retard rapid acceleration of the engine 18b of an automotive vehicle driven thereby in response to operation by the driver of the accelerator pedal.

It will thus be seen from the foregoing description, considered in conjunction with the accompanying drawings, that the present invention accomplishes its intended objects, and has the desirable advantages and characteristics, including those hereinbefore pointed out and others inherent in the invention.

While I have illustrated and described selected embodiments of my invention, it is to be understood that these are capable of variation and modification and I therefore do not wish to be limited to the precise details set forth but desire to avail myself of such changes and alterations as fall within the purview of the following claim.

I claim:

A device of the character described including a supporting plate adapted to be inserted in the joint of an air-fuel line of an internal combustion engine, said plate having a frusto-conical depressed seat portion surrounding a substantially central opening, a sheet metal spider secured on the under side of the frusto-conical depression, a headed post mounted in the said spider, a disk-valve having a depending sleeve mounted on said post, resilient means for maintaining said disk-valve against the head of the post, the disk-valve being normally above the frusto-conical depression, but under the influence of vacuum and pressure differential in the air-fuel line the said valve is depressed toward said seat and thereby regulating the quantity of the air-fuel mixture.

AUGUST F. MILLER.